(12) United States Patent
Sakata et al.

(10) Patent No.: US 6,414,768 B1
(45) Date of Patent: Jul. 2, 2002

(54) OPTICAL COMMUNICATION SYSTEM

(75) Inventors: Takashi Sakata; Takahiro Aramaki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/186,150

(22) Filed: Nov. 5, 1998

(30) Foreign Application Priority Data

Mar. 20, 1998 (JP) .......................................... 10-071785

(51) Int. Cl.[7] .................................................. H04J 14/00
(52) U.S. Cl. ........................ 359/119; 359/110; 359/127; 359/137; 359/125; 359/140; 359/161; 359/166; 359/173
(58) Field of Search ................................. 359/110, 161, 359/119, 140, 166, 125, 137, 127, 173

(56) References Cited

U.S. PATENT DOCUMENTS

| | | | | |
|---|---|---|---|---|
| 5,345,438 A | * | 9/1994 | Ozaki | 370/16 |
| 5,523,870 A | * | 6/1996 | Suzuki et al. | 359/139 |
| 5,539,564 A | * | 7/1996 | Kumozaki et al. | 359/161 |
| 5,576,875 A | * | 11/1996 | Chawki et al. | 359/125 |
| 5,680,234 A | * | 10/1997 | Darcie et al. | 359/110 |
| 5,717,795 A | * | 2/1998 | Sharma et al. | 385/24 |
| 5,737,338 A | * | 4/1998 | Eguchi et al. | 371/20.5 |
| 5,796,501 A | * | 8/1998 | Sotom et al. | 359/119 |
| 5,949,563 A | * | 9/1999 | Takada | 359/124 |
| 6,072,610 A | * | 6/2000 | Kuroyanagi et al. | 359/117 |
| 6,108,112 A | * | 8/2000 | Touma | 359/110 |
| 6,137,603 A | * | 10/2000 | Henmi | 359/110 |
| 6,222,654 B1 | * | 4/2001 | Frigo | 359/119 |
| 6,288,809 B1 | * | 9/2001 | Touma et al. | 359/125 |
| 6,304,346 B1 | * | 10/2001 | Sawada et al. | 359/110 |

FOREIGN PATENT DOCUMENTS

JP          57-186855          11/1982

* cited by examiner

*Primary Examiner*—Leslie Pascal
*Assistant Examiner*—Hanh Phan
(74) *Attorney, Agent, or Firm*—Staas & Halsey LLP

(57) ABSTRACT

The optical communication system employs PON system. An office device includes a pair of an optical transmitting/receiving devices. A subscriber line, which is a single core optical fiber, is connected to the optical transmitting/receiving devices at each terminal to form a loop network. Subscriber devices are connected to the network via passive optical branching/coupling elements. When the office device transmits a test signal, the subscriber devices transmit response signals corresponding to the test signal. The office device specifies fault point based on the response signals received by the optical transmitting/receiving devices.

5 Claims, 10 Drawing Sheets

OPTICAL COUPLER #1  10 : 90
OPTICAL COUPLER #2  90 : 10
OPTICAL COUPLER #3  10 : 90

OPTICAL COMMUNICATION SYSTEM

BACKGROUND OF THE INVENTION

The present invention relates to an optical communication system using an optical branching/coupling device.

In one example of a conventional optical communication system, as shown in FIG. 10, an office device accommodates subscriber devices that need a high speed and large capacity communication through exclusive optical fibers (transmission lines) respectively.

On the other hand, a PON(Passive Optical Network) system was developed and practically used in resent years. The PON system is suitable that an office device accommodates subscriber devices that need wide band communication at low cost.

The PON is, as shown in FIG. 11, provided with an optical branching/coupling element between the subscriber devices and the office device. The optical branching/coupling element is a passive device that does not need an electric source. The office device is connected to the optical branching/coupling element through a single optical fiber or a double optical fiber due to redundancy. Each of the subscriber devices is connected to the optical branching/coupling element through an exclusive optical fiber.

The optical branching/coupling element distributes a downstream optical signal from the office device toward each of the subscriber devices. And also, the element combines an upstream optical signal from the subscriber device toward the office device. As shown in FIG. 3, TDMA (Time Division Multiple Access) is used for the upstream communication in order to multiplex the upstream signal from the subscriber devices on the single optical fiber. TDM (Time Division Multiplexing) is used for the downstream communication in order to multiplex the downstream signal toward the subscriber devices.

The PON can reduce construction cost of the communication system compared with the on-to-one connection in FIG. 10 because of sharing the optical fiber between the office device and the optical branching/coupling element. Further, since the PON uses the passive device as the optical branching/coupling element, it improves the system reliability in maintenance compared with the system using a passive element to multiplex the optical signal.

However, each of the subscriber devices and the optical branching/coupling element are connected by the single optical fiber in the PON, it has a low system reliability in a resistance to a transmission line fault such as a disconnection of the optical fiber.

An optical ring network is known as the other type of the conventional optical communication system. The optical ring network includes an optical fiber arranged like a ring and data flow only one direction in the optical fiber. The subscriber devices are connected at any points to the transmission line. In such the optical ring network, since the data flow in one direction, the disconnection of the optical fiber or a cut off of the power supply of the node device results the system down due to stop of data flow. In order to avoid such the system down, a bypath function and/or a loopback function are usually prepared in the optical ring network.

FIG. 12 shows the bypath function. The bypath function forms the data flow along the route shown in a broken line without passing the node device. In the normal state, the data flow along the route shown in a solid line via the node device.

As shown in FIG. 13, any faults in the optical transmission line control the node devices, which are located with the fault portion between, to turn back the data flow and to form a new loop. It is the loopback function.

The ring network is provided with optical switches to exchange the optical fibers for the bypath function and/or the loopback function.

A conventional optical ring network is, for example, disclosed in Japanese laid-open patent publication No. Sho 57-1866855. The network disclosed in the publication employs an 1-to-n optical communication system that includes a center device, n pieces of remote devices and an optical fiber loop that connects the devices. The number n is an integer that equals to or is larger than 2. The center device switches the data transmitting mode using the optical switch. In a first mode, the center device transmits the data in one direction to the transmission line. In a second mode, the center device transmits the data in both directions via an optical branching element.

The remote devices pick up and receive the data (the optical signal) from the transmission line in spite of the direction of the data flow.

The disconnection of the optical fiber changes the transmission mode from the first mode to the second mode so that all of the remote devices are able to receive the optical data signal. However, since there is an one side communication from the center device to the remote devices in the conventional ring network, the center device cannot specify the fault portion in the transmission optical fiber.

SUMMARY OF THE INVENTION

The present invention is aim to provide an optical communication system, which includes an optical branching/coupling element, can certainly detect a transmission line fault such as a disconnection of an optical fiber.

According to an aspect of the present invention, an optical communication system includes:

- an office device that includes a pair of optical transmitting/receiving devices for act and standby systems;
- a subscriber line that is a ring network of an optical fiber of which one terminal is connected to the optical transmitting/receiving device of the act system and the other terminal is connected to the optical transmitting/receiving device of the standby system;
- a plurality of optical branching/coupling elements that are passive elements arranged on the subscriber line;
- a plurality of subscriber devices arranged corresponding to the optical branching/coupling element to be connected to the branched lines;
- means for detecting faults generated in the subscriber line; and
- means for controlling the optical transmitting/receiving devices, wherein the controlling device actuates the optical transmitting/receiving device of the act system in normal state and actuates both of the optical transmitting/receiving devices when the detecting means detect any faults.

It is desirable that the subscriber line is a single core optical fiber.

Preferably, the office device further comprises means for transmitting a test signal, each of the subscriber devices includes means for transmitting a response signal corresponding to the test signal and the detecting means specifies fault point based on the response signals from the subscriber devices.

In the preferred embodiment, the optical branching/coupling element comprises first, second and third optical couplers that are connected one another to form a triangle network. The first optical coupler distributes light from the act system between the connected subscriber device and the subscriber line at the standby system side, the second optical coupler distributes light from the standby system between the connected subscriber device and the subscriber line at the act system side, and the third optical coupler distributes light from the connected subscriber device between the act system and the standby system.

The distribution ratios of the first, second and third optical couplers may be determined based on the location of the connected subscriber device in the ring network.

If the distribution ratio of the connected subscriber device side to the subscriber line side at the first optical coupler is assumed as m:n, this ratios at the second optical coupler should be n:m, the distribution ratio of the act system side to the standby system side at the third optical coupler should be m:n. In such the case, increased distance from the optical transmitting/receiving device of the act system increases the value of m, but decreases the value of n.

DETAILED DESCRIPTION OF THE PREFERRED EMBODIMENTS

Preferred embodiments of the present invention will hereinafter be discussed with reference to the accompanying drawings.

Figure 1:
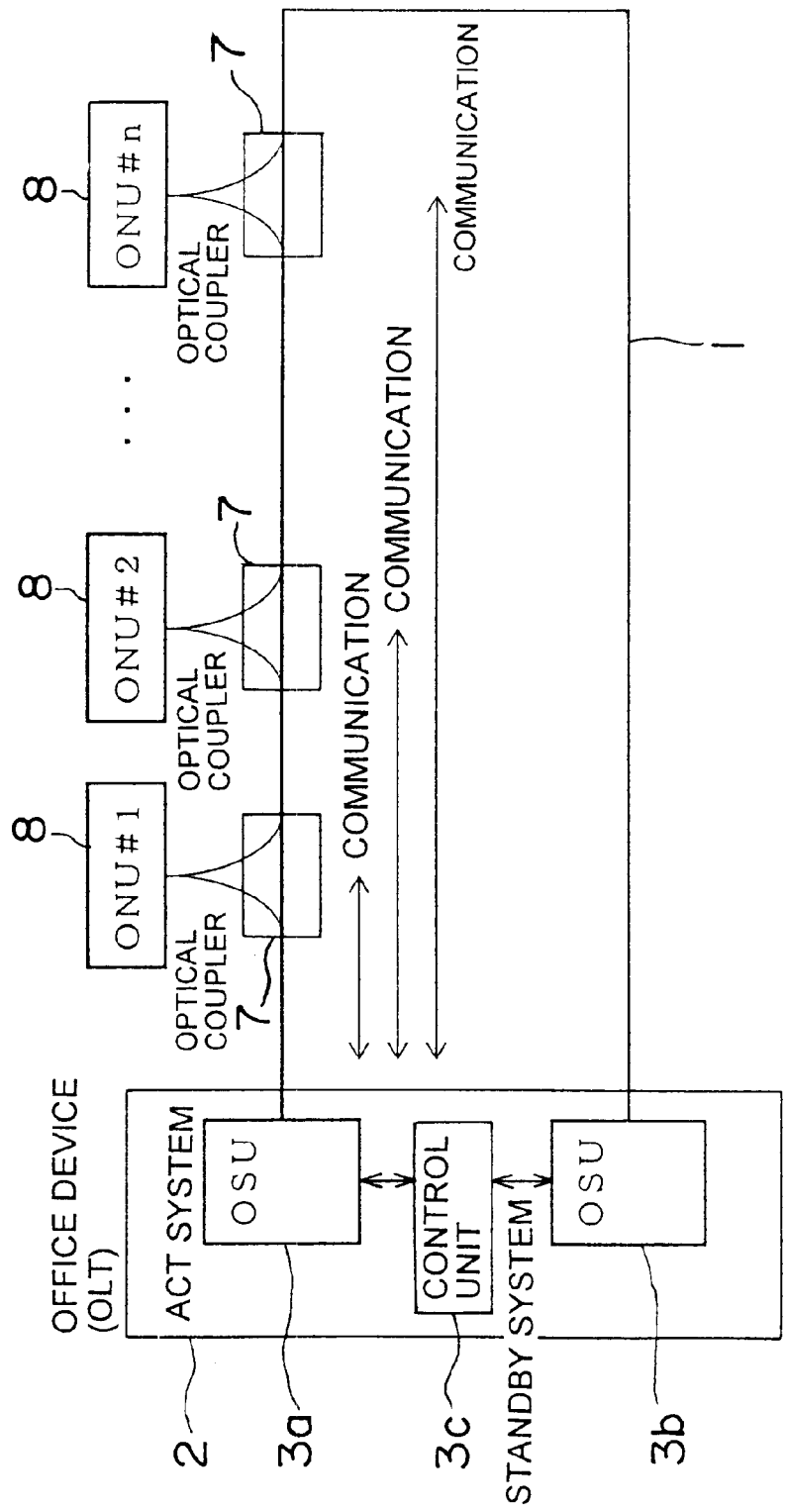
FIG. 1 shows a configuration of a first embodiment according to the present invention.

As shown in FIG. 1, an optical communication system of a first embodiment, which employs the PON system, is provided with a subscriber line 1 as an optical transmission line that is arranged as a loop using a single core optical fiber. The terminals of the subscriber line 1 are connected to an office device 2. One terminal of the subscriber line 1 is connected to a first OSU (Optical Service Unit) 3a as an optical transmitting/receiving device provided in an office device 2 and the other terminal is connected to a second OSU 3b included in the office device 2. The first OSU 3a uses the subscriber line 1 from one side as an act system and the second OSU 3b uses the same line 1 from the other side as a standby system. As a result, the subscriber line 1 is used as a double transmission line. The office device 2 further comprises a control unit 3c to control the first and second OSU 3a and 3b. The functions of the control unit 3c will be described below.

Figure 2:
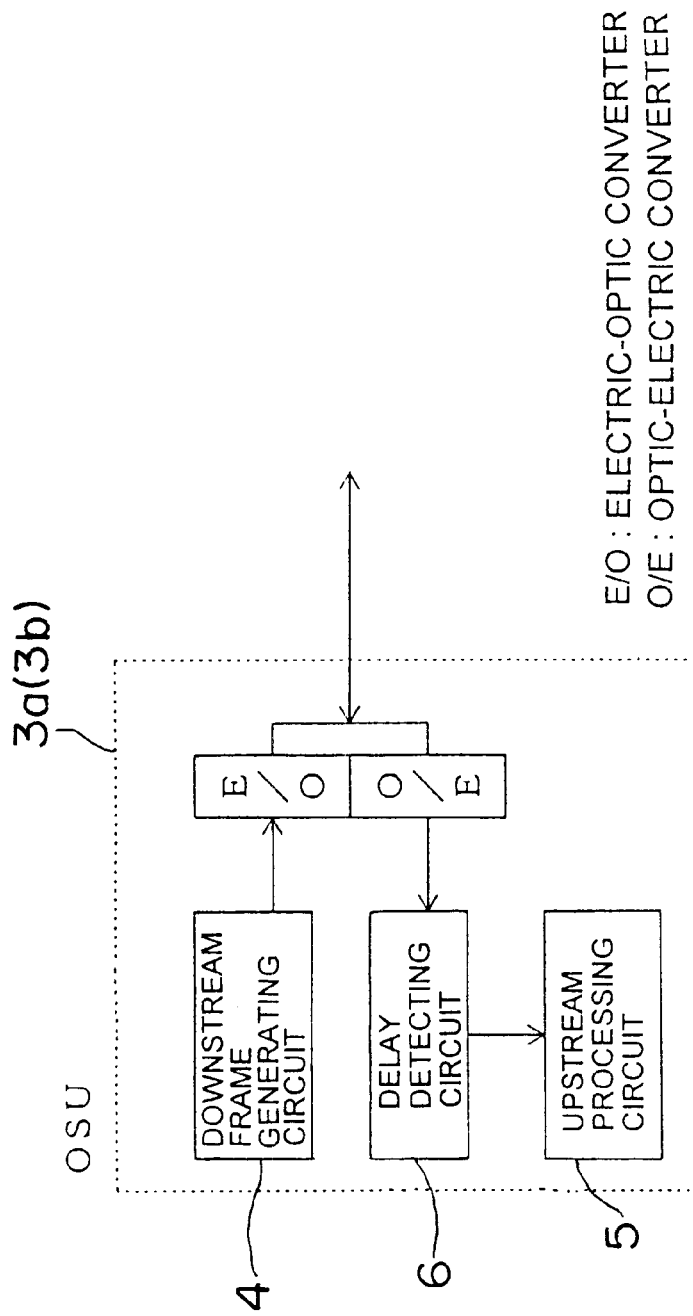
FIG. 2 is a block diagram showing configuration of an OSU.

The first OSU 3a is, as shown in FIG. 2, provided with a downstream frame generating circuit 4 as a transmitting device and an upstream frame processing circuit 5 as a receiving device. The circuit 4 is connected to the optical fiber via an electric-optic converter E/O. The circuit 5 is connected to the optical fiber via an optic-electric converter O/E and a delay detecting circuit 6. The second OSU 3b is also provided with the same circuits as the first OSU 3a.

On the other hand, along the looped subscriber line 1, a plurality of optical star couplers 7 are located as an optical branching/coupling element. Each of subscriber devices (Optical Node Unit; ONU#1, ONU#2, . . . , ONU#n) 8 is connected to the corresponding optical star coupler 7, and thus the subscriber devices 8 are accommodated by a continuous loop of the optical fiber. That is, a subscriber devices 8 and an optical star coupler 7 are connected to each other through a double transmission line. An optical star coupler 7 is a passive element that does not need a power source.

Figure 3:
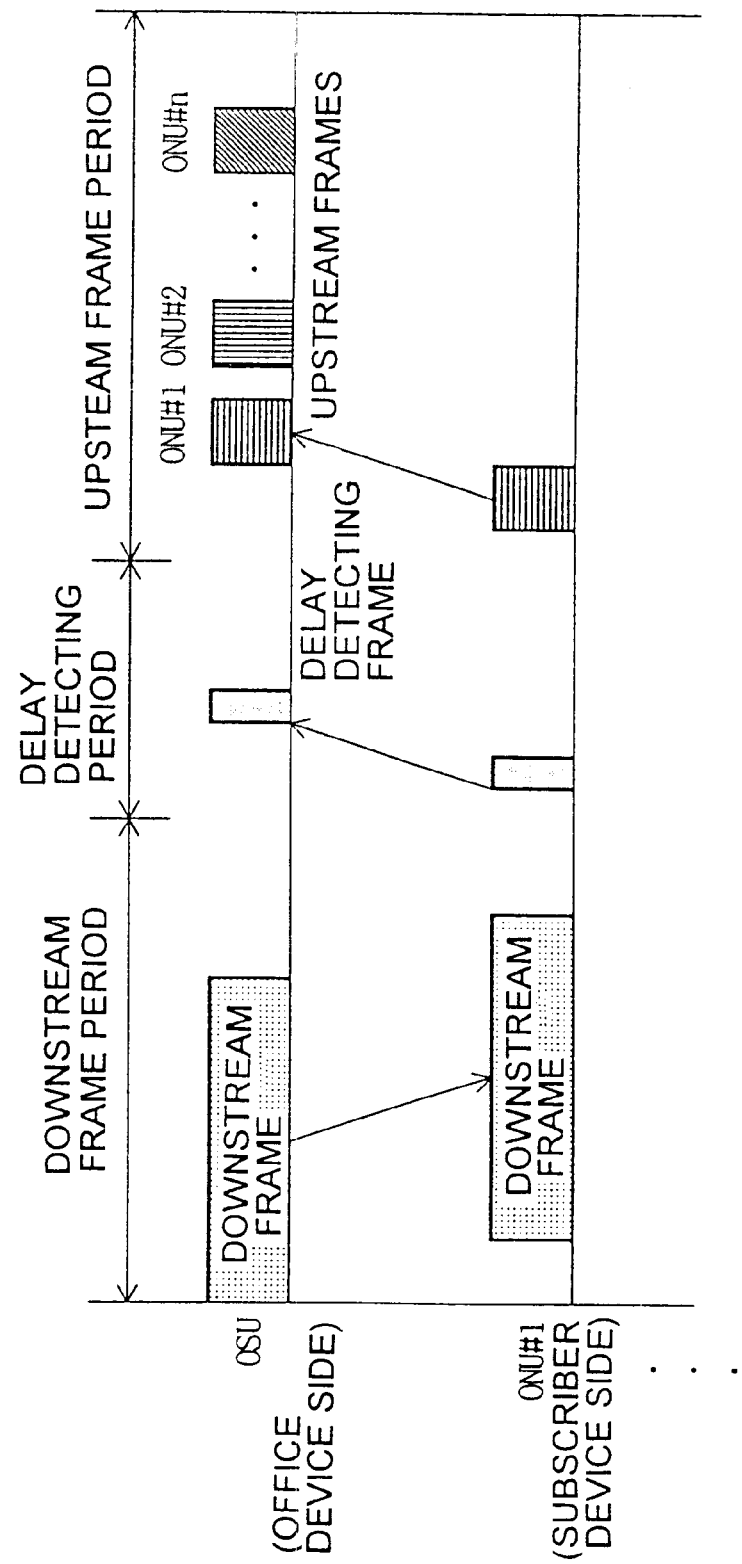
FIG. 3 shows a frame construction of TDM/TDMA.

Every subscriber device 8 employs TDMA (Time Division Multiple Access) for the upstream communication and TDM (Time Division Multiplexing) for downstream communication as shown in FIG. 3.

Figure 4:
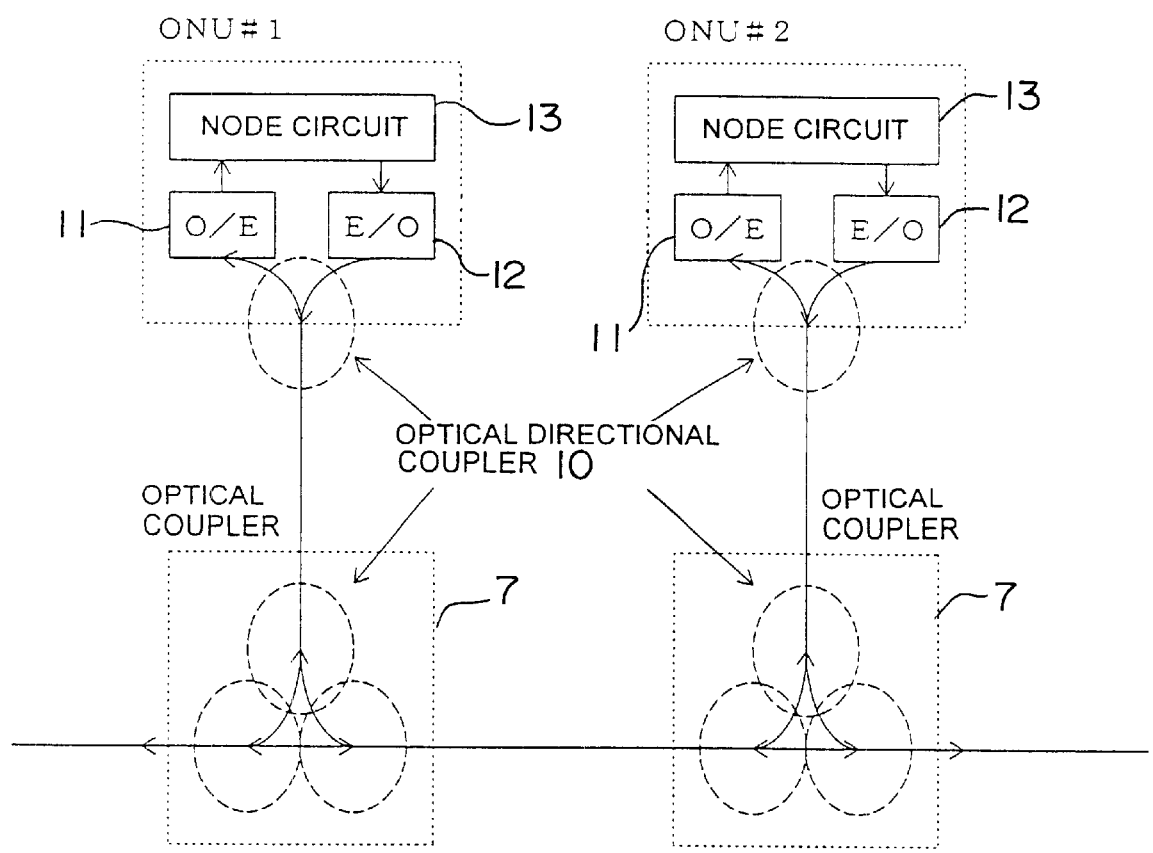
FIG. 4 shows a connection state of an optical directional coupler and subscriber devices.

The subscriber device 8 is connected to the looped subscriber line 1 via an optical directional coupler 10 as shown in FIG. 4. The subscriber device 8 includes a node circuit 13 that is connected to the optical directional coupler 10 via an optic-electric convertor 11 and an electric-optic convertor 12.

Next, the operation of the optical communication system of the first embodiment will be discussed.

As shown in FIG. 3, when the first OSU 3a transmits a downstream frame as a test signal and this frame is received by the subscriber device 8, the subscriber device 8 transmits a delay detection frame as a response signal. The delay detecting circuits 6 of the first and second OSU 3a and 3b measure the delay times to specify the subscriber device that transmits the delay detecting frame. The first and second OSU 3a and 3b inform the control unit 3c of the detection of the delay detecting frame.

If the first OSU 3a confirms the delay detecting frames from all of the subscriber devices 8, the control unit 3c determines there are no faults in the subscriber line 1 and starts the first OSU 3a for a communication. Each of the subscriber devices 8 receives the downstream frame transmitted from the first OSU 3a via the optical star coupler 7. And also, an upstream frame from a subscriber device 8 is received by the first OSU 3a. Absence of fault allows a suspension of the second OSU 3b.

On the other hand, if the first OSU 3a only confirms the delay detecting frames from a part of the subscriber devices 8, the control unit 3c determines there are any faults in the subscriber line 1 and actuates the second OSU 3b as well as the first OSU 3a. That is, both of the first and second OSU 3a and 3b are used for communication. As a result, the subscriber devices 8 at the one side of the fault portion communicate with the first OSU 3a of the act system, and the devices 8 at the other side of the fault portion communicate with the second OSU 3b of the standby system.

Further, the control unit 3c is able to detect the fault point based on results of the received delay detecting frames.

Namely, the optical communication system comprises a fault detecting means that detects fault generated in the subscriber line 1. The function of the fault detecting means is distributed to the OSU 3a, the control unit 3c and the subscriber device 8. The OSU 3a transmits a test signal, the subscriber device 8 returns the response signal, and the control unit 3c determines whether any faults occur based on the received response signal.

The control unit 3c further provides a function of the controlling means that actuates the first OSU 3a in normal state and actuates both of the OSU 3a and 3b when any faults are detected.

Figure 5:
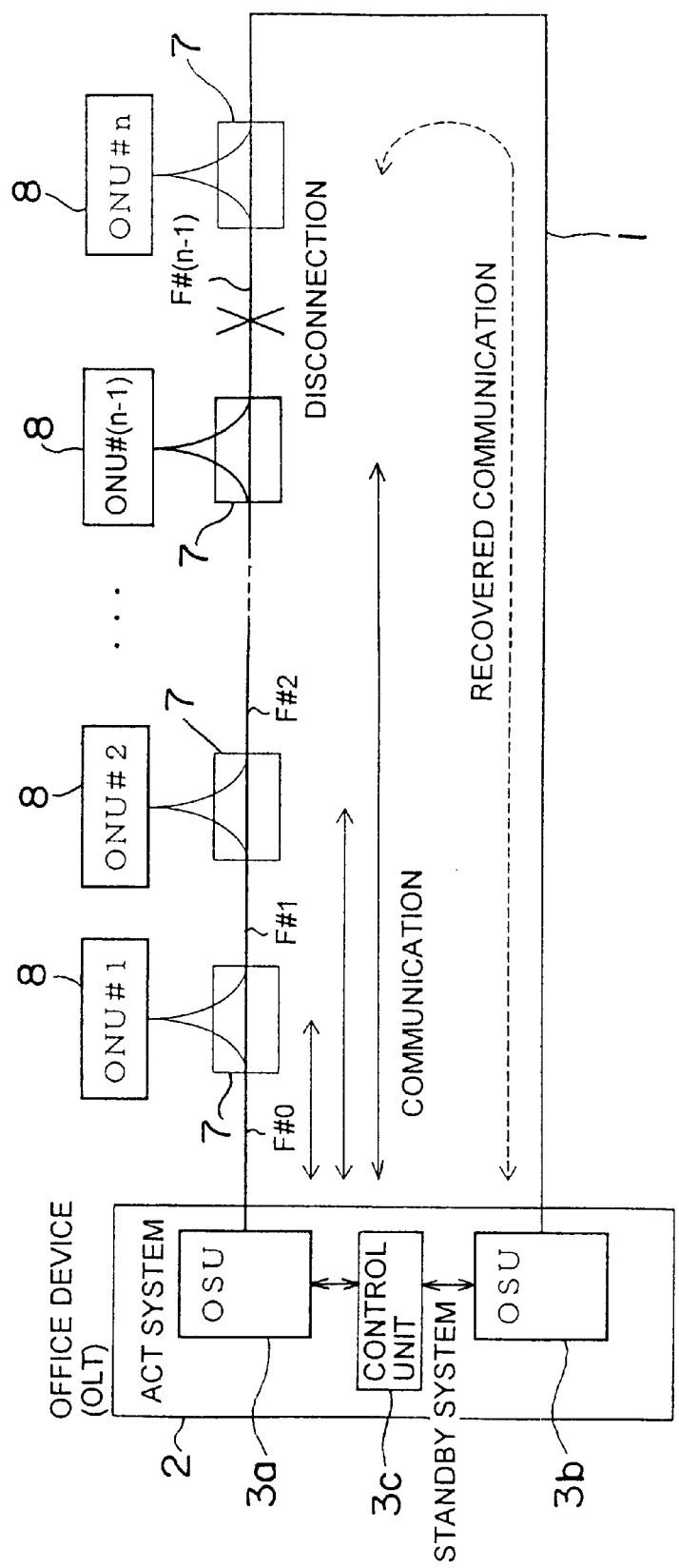
FIG. 5 shows a switching state of the system in the ring network of the first embodiment.

For instance, as shown in FIG. 5, a disconnection of the subscriber line 1 between the ONU#(n−1) and the ONU#n results the communication between the subscriber devices ONU#1, ONU#2, . . . , ONU#(n−1) and the first OSU 3a of the act system and the communication between the subscriber device ONU#n and the second OSU 3b of the standby system.

Figure 6:
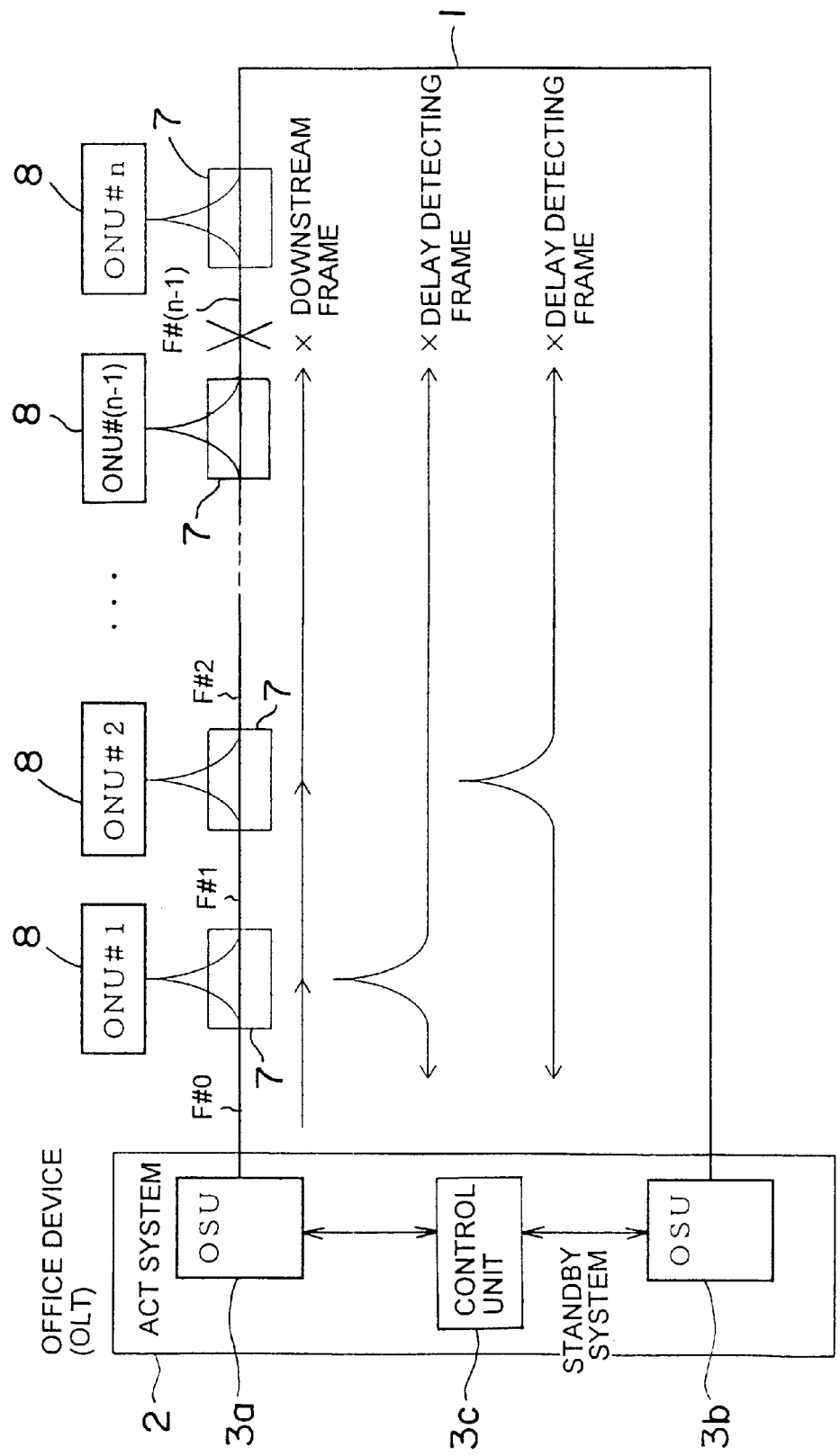
FIG. 6 shows a finding method of a damaged (trouble) portion according to the first embodiment.

Sequentially, as shown in FIG. 6, each of the subscriber devices 8 transmits the delay detection frame for the office device 2 to specify the fault point. The office device 2 specifies the fault point based on the condition of the delay detecting frame received by the OSU 3a and 3b. The fault point will be determined as shown in TABLE 1. The subscriber line 1 is segmented into a plurality of portions F#0, F#1, . . . , F#n.

TABLE 1

| Transmission Device | OSU 3a of Act system | OSU 3b of Standby system | Determination |
| --- | --- | --- | --- |
| (a) ONU#1 . . . #n | Receive All | Receive All | Normal |
| (b) ONU#1 . . . #n | Not Receive | Receive All | Disconnect F#0 |
| (c) ONU#1 | Receive | Not Receive | Disconnect F#1 |
| (d) ONU#2 | Receive | Not Receive | Disconnect F#2 |
| . | | | |
| . | | | |
| . | | | |
| (n) ONU#n | Receive | Not Receive | Disconnect F#(n−1) |

For example, the receiving of all of the delay detecting frames at the OSU 3a and 3b indicates the normal state of the subscriber line 1 as in the case (a). As in the case (c), when the delay detecting frame from ONU#1 is received at first OSU 3a but not received at second OSU 3b, it is determined that the subscriber line 1 is disconnected at the segment F#1 between the ONU#l and the ONU#2.

As described above, the specification of the disconnection point based on the receiving condition of the delay detecting frames decreases time required for restoration of the subscriber line 1.

Further, the second OSU 3b of the standby system is also used when the subscriber line 1 is disconnected in order to add a new subscriber device. It decreases time for stopping the communication for establishing more subscriber devices.

Next, the construction of the optical star coupler 7 will be explained.

Figure 7:
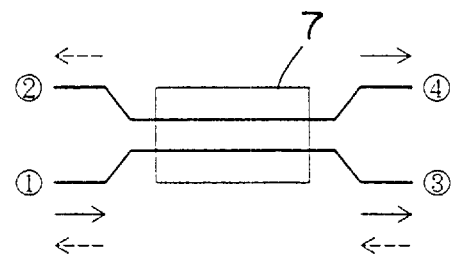
FIG. 7 shows an example of optical coupler of fiber type device (an optical directional coupler)

FIG. 7 shows an example of an optical coupler (an optical directional coupler) of a fiber type device that is an element of the optical star coupler 7. Light input in a port (1) is distributed to ports (3) and (4) but not to a port (2). In the same manner, light input in the port (3) is distributed to the ports (1) and (2) but not to the port (4).

Figure 8:
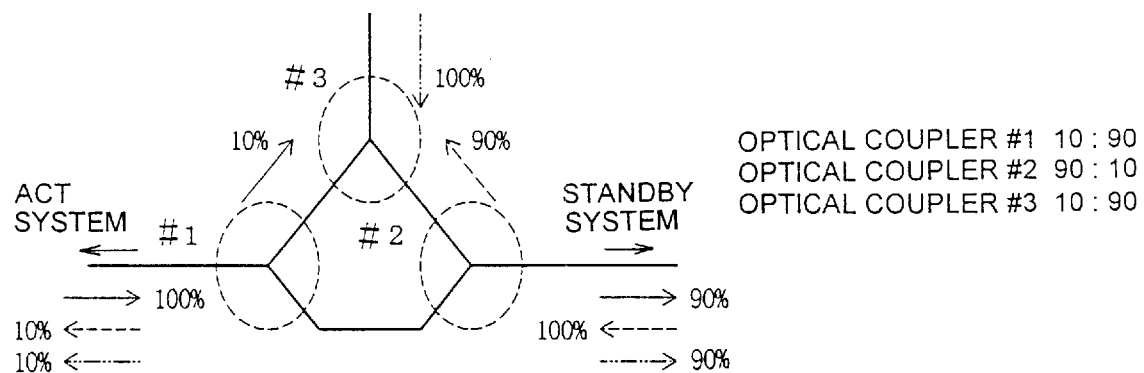
FIG. 8 shows an example of an optical star coupler.

FIG. 8 shows one example of a specific construction of the optical star coupler 7 that consists of first, second and third optical couplers #1, #2 and #3.

The first optical coupler #1 distributes light from the act system between the connected subscriber device 8 and the subscriber line 1 at the standby system side. The second optical coupler #2 distributes light from the standby system between the connected subscriber device 8 and the subscriber line 1 at the act system side. And the third optical coupler #3 distributes light from the connected subscriber device 8 between the act system and the standby system.

The distribution ratios of the optical couplers #1, #2 and #3 are determined based on the location of the connected subscriber device 8 in the ring network. If the distribution ratio of the connected subscriber device side to the subscriber line side at the first optical coupler is assumed as m:n, this ratios at the second optical coupler should be n:m, the distribution ratio of the act system side to the standby system side at the third optical coupler should be m:n. In such the case, increased distance from the first OSU 3a of the act system increases the value of m, but decreases the value of n.

For instance, in the example of FIG. 8, value of m equals 10% and n equals 90%. That is, the optical coupler #1 has light distribution ratio of 10:90, the optical coupler #2 has the ratio of 90:10 and the coupler #3 has the ratio of 10:90. Light input in the optical coupler #1 is distributed to the optical coupler #2 by 90% and to the optical coupler #3 by 10%. Light input in the optical coupler #2 is distributed to the optical coupler #1 by 10% and to the optical coupler #3 by 90%. Light input in the optical coupler #3 is distributed to the optical couplers #1 by 10% and to the optical coupler #2 by 90%.

Figure 9:
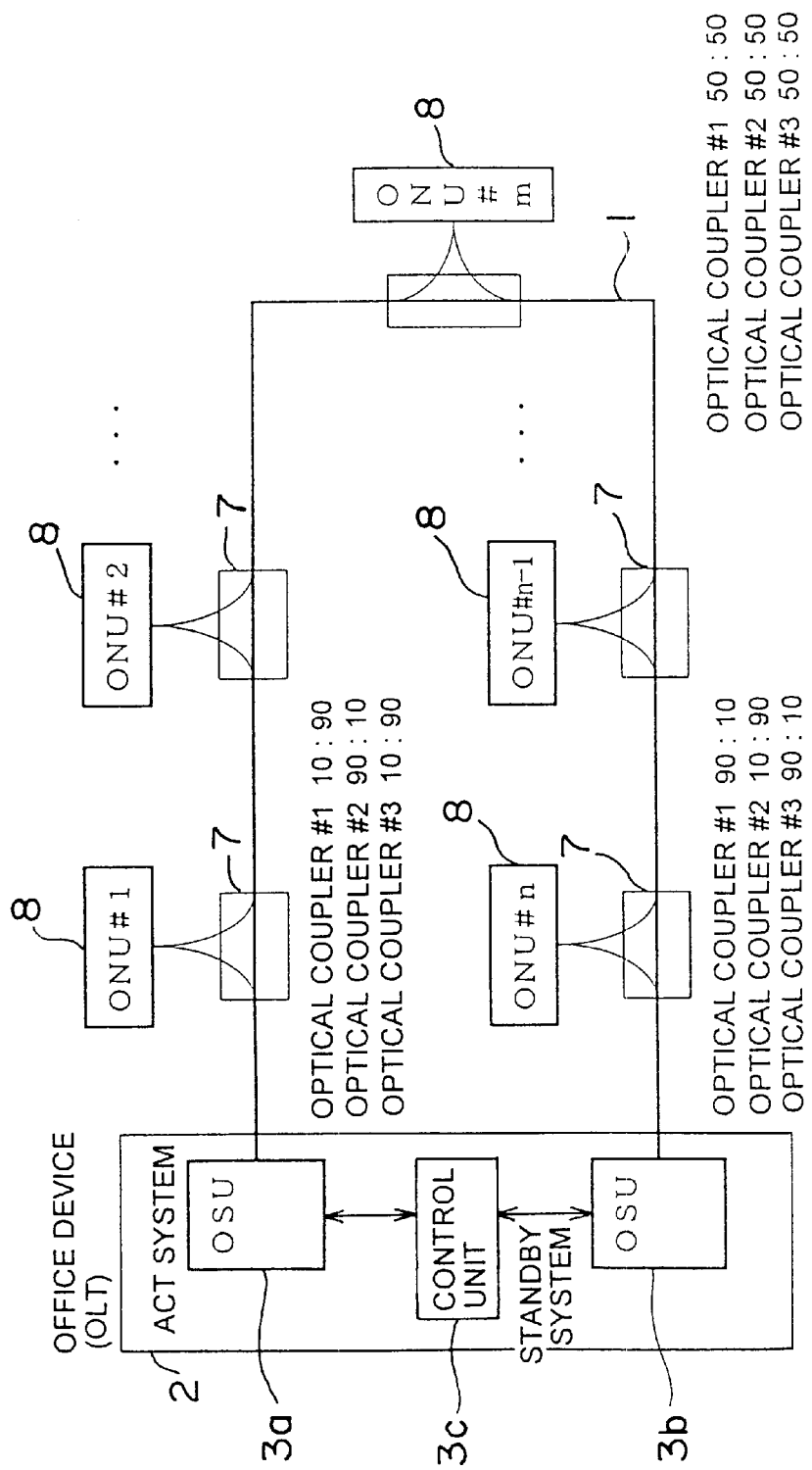
FIG. 9 shows a configuration of a second embodiment according to the present invention.
Figure 10:
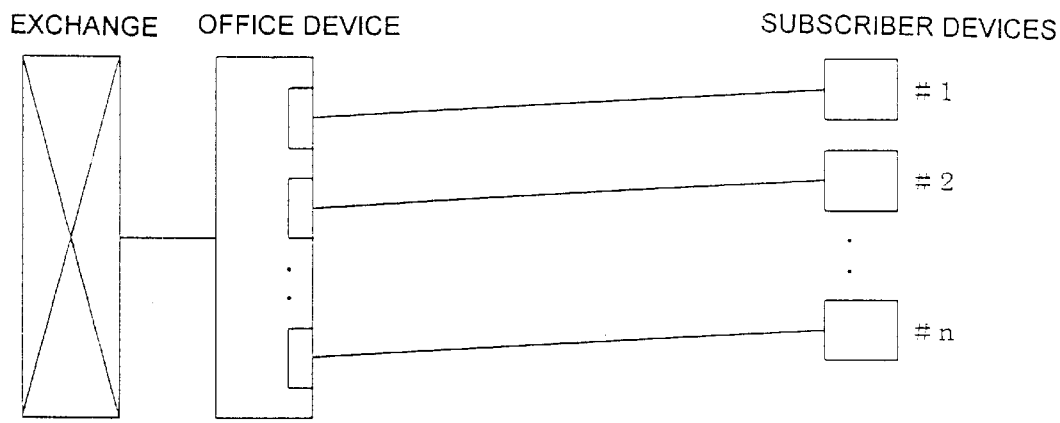
FIG. 10 shows a conventional optical communication system.
Figure 11:
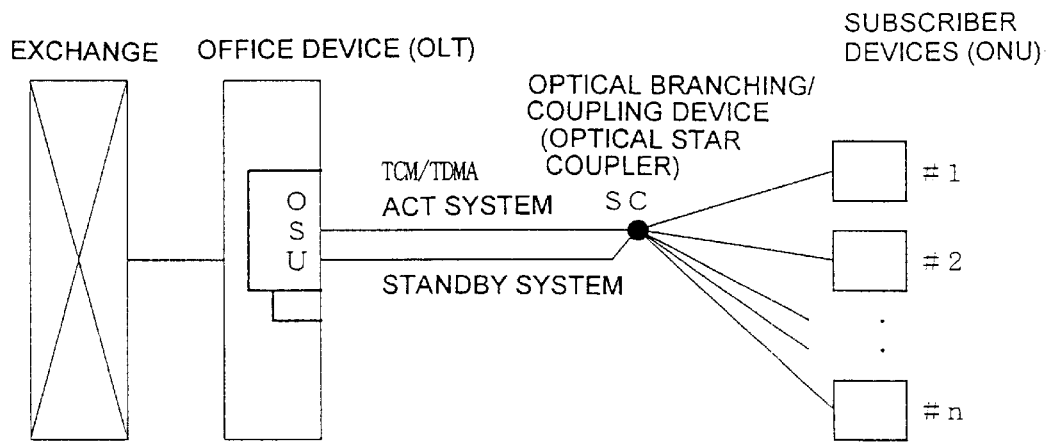
FIG. 11 shows a conventional PON system.
Figure 12:
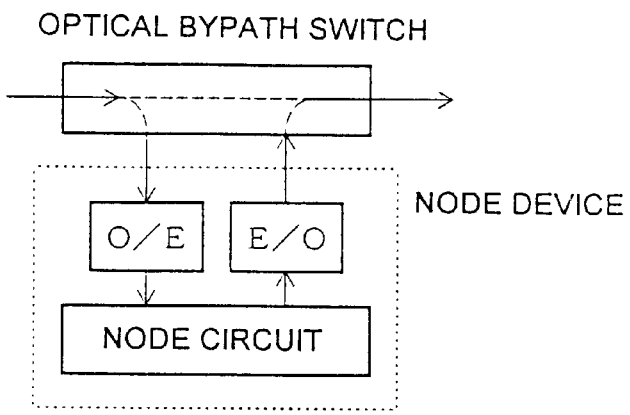
FIG. 12 shows the node device which uses an optical bypath switch.
Figure 13:
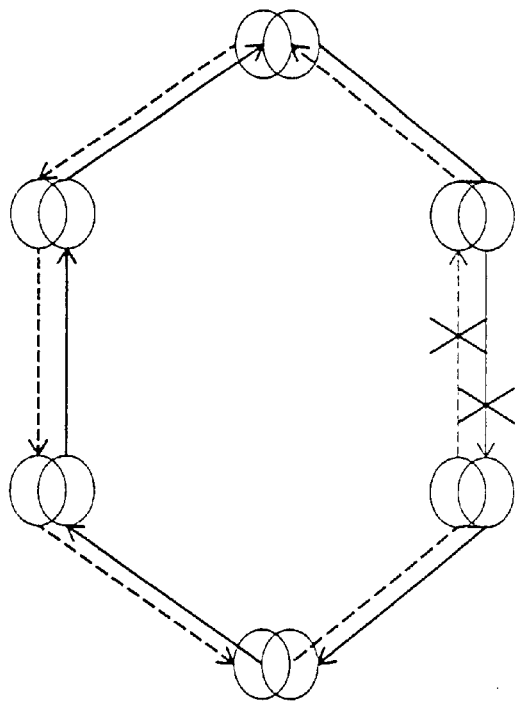
FIG. 13 shows a loopback function of a conventional optical ring network.

FIG. 9 shows an optical communication system of a second embodiment that comprises optical star couplers having various distribution ratios.

The optical star coupler 7 connected to the subscriber device ONU#1 consists of optical couplers #1, #2 and #3 of which distribution ratios are 10:90, 90:10 and 10:90 respectively. The closest location to the first OSU. 3a of the act system results small loss of light quantity for a downstream frame from the first OSU 3a. This allows a small branching percentage (10%) from the subscriber line 1 to the ONU#n at the side of the act system. On the contrary, the farthest location from the second OSU 3b of the standby system results large loss of light quantity for a downstream frame from the second OSU 3b. This requires a large branching percentage (90%) from the subscriber line 1 to the ONU#1 at the side of the standby system. The optical coupler #3 distributes the delay detecting frame from the ONU#1 to the first OSU 3a by 10% and to the second OSU 3b by 90%.

The optical star coupler 7 connected to the subscriber device ONU#m consists of optical couplers #1, #2 and #3 of which distribution ratios are 50:50. The optical coupler #1 branches 50% of the downstream frame from the first OSU 3a to the ONU#m. The downstream frame from the second OSU 3b is branched by 50% to the ONU#m at the optical coupler #2. The optical coupler #3 distributes the delay detecting frame or the upstream frame from the ONU#m to the first OSU 3a by 50% and to the second OSU 3b by 50% too.

The optical star coupler 7 connected to the subscriber device ONU#n consists of optical couplers #1, #2 and #3 of which distribution ratios are 90:10, 10:90 and 90:10 respectively. The closest location to the second OSU 3b of the standby system results small loss of light quantity for a downstream frame from the second OSU 3b. This allows a small branching percentage (10%) from the subscriber line 1 to the ONU#n at the side of the standby system. On the contrary, the farthest location from the first OSU 3a of the act system results large loss of light quantity for a downstream frame from the first OSU 3a. This requires a large branching percentage (90%) from the subscriber line 1 to the ONU#n at the side of the act system. The optical coupler #3 distributes the delay detecting frame from the ONU#n to the first OSU 3 a by 90% and to the second OSU 3b by 10%.

The combination of the optical couplers having desired distribution ratios allows effective light distribution for each of the subscriber devices, which allows long distance communication.

The communication systems of the embodiments employ redundant (double) connection between the office device 2 and each of the subscriber devices 8 through the single core optical fiber, which increases communication reliability.

The communication systems of the embodiments provide the following advantages over the conventional ring network.
(1) One piece of a single core optical fiber can be used as the subscriber line.
(2) Only one optical transmitting/receiving device is required for the node device as the subscriber device.
(3) An addition of a new subscriber device at the final end of the ring network does not need an exchange of the transmission line to the standby system, which allows easy operation.
(4) Turning off of the node device (subscriber device) does not require specific functions such as a bypath function or a loopback function.

What is claimed is:
1. An optical communication system comprising:
    an office device that includes a pair of optical transmitting/receiving devices for act and standby systems;
    a subscriber line that is a ring network of an optical fiber of which one terminal is connected to said optical transmitting/receiving device of the act system and the other terminal is connected to said optical transmitting/receiving device of the standby system;
    a plurality of optical power branching/coupling elements that are passive elements arranged on said subscriber line to branch the subscriber line;
    a plurality of subscriber devices arranged corresponding to said optical branching/coupling element to be connected to the branched lines from the optical branching/coupling elements;
    means for specifying fault points in said subscriber line; and
    means for controlling said optical transmitting/receiving devices, wherein said controlling device actuates said optical transmitting/receiving device of said act system in normal state and actuates both of said optical transmitting/receiving devices when said detecting means detect any faults.

2. The optical communication system according to claim 1, wherein said subscriber line is a single core optical fiber.

3. The optical communication system according to claim 1, wherein said office device further comprises means for transmitting a test signal, each of said subscriber devices includes means for transmitting a response signal corresponding to said test signal and said detecting means specifies fault point based on said response signals from said subscriber devices.

4. The optical communication system according to claim 1, wherein said optical branching/coupling element comprises first, second and third optical couplers that are connected one another to form a triangle network, wherein said first optical coupler distributes light from said act system between the connected subscriber device and the subscriber line at the standby system side, said second optical coupler distributes light from said standby system between the connected subscriber device and the subscriber line at the act system side, and said third optical coupler distributes light from the connected subscriber device between said act system and said standby system.

5. An optical communication system comprising:
    a pair of optical active and standby transmitting/receiving systems and a controller controlling the systems;
    a looped optical fiber, one terminal of the optical fiber connected to the active optical transmitting/receiving system and other terminal of the optical fiber connected to the standby optical transmitting/receiving system; and
    passive optical branching/coupling elements arranged on the optical fiber, each element connecting a corresponding device to the optical fiber, the controller detecting faults in the optical fiber responsive to time delay detecting frames transmitted/received by the systems and the devices via the elements on the optical fiber.

* * * * *